(12) United States Patent
Schneider

(10) Patent No.: US 6,989,197 B2
(45) Date of Patent: Jan. 24, 2006

(54) POLYMER COMPOSITE STRUCTURE REINFORCED WITH SHAPE MEMORY ALLOY AND METHOD OF MANUFACTURING SAME

(75) Inventor: Terry L. Schneider, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 10/287,561

(22) Filed: Nov. 4, 2002

(65) Prior Publication Data

US 2004/0086699 A1 May 6, 2004

(51) Int. Cl.
*B32B 27/38* (2006.01)

(52) U.S. Cl. .................. 428/416; 428/414; 428/406; 428/172; 428/212; 428/220; 428/295.1; 428/297.1; 428/332

(58) Field of Classification Search ............. 428/414, 428/416, 172, 212, 220, 295.1, 297.1, 332, 428/406, 402, 407
See application file for complete search history.

(56) References Cited

U.S. PATENT DOCUMENTS

| | | | |
|---|---|---|---|
| 5,614,305 A | | 3/1997 | Paine et al. |
| 5,804,276 A | | 9/1998 | Jacobs et al. |
| 6,408,562 B1 | * | 6/2002 | Sunaga et al. ............. 43/24 |
| 6,432,541 B1 | * | 8/2002 | Gan ........................ 428/416 |

FOREIGN PATENT DOCUMENTS

| | | |
|---|---|---|
| JP | H4-207100 | 7/1992 |
| JP | H6-36613 | 2/1994 |

OTHER PUBLICATIONS

Ni–Ti SMA–Reinforced AL Composites by G.A. Porter, P.K. Liaw, T.N. Tiegs and K.H. Wu, Oct. 2000.

"Preparation of a smart composite material with TiNiCu shape memory particulates in an aluminum matrix" by Z.G. Wei, C.Y. Tang, W.B. Lee, L.S. Cui and D.Z. Yang; Oct. 1997.

"Increased Impact Damage Resistance of Shape Memory Alloy Composites" by Kelly A. Tsoi, Rudy Stalmans, Martine Wevers, Jan Schrooten and Yiu–Wing Mai; date unknown.

"Fracture toughening mechanism of shape memory alloys due to martensite transformation" by Sung Yi and Shan Gao; date unknown.

"On the Interaction Between Transformation Toughening and Crack Bridging by Ductile Layers in Hybrid Composites" by M. Li, N. Katsube and W.O. Soboybio, Journal of Composite Materials, vol. 35, No. 12/2001.

"The Evolution of an Aerospace Material: Influence of Design, Manufacturing, and In–Service Performance" by Alan G. Miller and Donald T. Lovell and James C. Seferis; Composite Structures 0263–8223/93/S06.00; 1993 Elsevier Science Publishers Ltd., England.

* cited by examiner

*Primary Examiner*—Merrick Dixon
(74) *Attorney, Agent, or Firm*—Harness, Dickey & Pierce, P.L.C.

(57) ABSTRACT

A polymer composite structure having resin matrix interlayers reinforced with shape memory alloy (SMA) particles. In one preferred form Nitinol® alloy particles are used for the SMA particles. The Nitinol® alloy particles may comprise cylindrical, oval or spherical shaped particles and are intermixed in the resin of the resin matrix interlayer(s) of the composite structure. The SMA particles provide superelastic, reversible strain properties that significantly improve the damage resistance, damage tolerance (e.g. compression-after-impact (CAI) strength) and elevated temperature performance of the composite structure without negatively affecting the hot-wet compression strength of the composite structure. The polymer composite structure is ideally suited for aerospace and aircraft applications where lightweight and structurally strong materials are essential.

10 Claims, 1 Drawing Sheet

POLYMER COMPOSITE STRUCTURE REINFORCED WITH SHAPE MEMORY ALLOY AND METHOD OF MANUFACTURING SAME

FIELD OF THE INVENTION

The present invention relates to polymer composite structures, and more particularly to a polymer composite structure having a resin matrix interlayer infused with shape memory alloy particles to significantly enhance the damage resistance, damage tolerance (e.g. compression-after-impact strength) and elevated temperature performance of the structure.

BACKGROUND OF THE INVENTION

Polymer composite materials selected and qualified for various applications, such as with primary structure applications in the manufacture of aircraft, are evaluated for two key mechanical properties: compression-after-impact (CAI) strength and hot-wet compression strength, and more specifically open-hole-compression (OHC) strength. However, the means for increasing a composite material's CAI strength and hot-wet OHC strength have typically been counterproductive to each other. More specifically, traditional particulate interlayer toughening methods using elastomeric or thermoplastic-based polymer particles have been effective for increasing a composite's CAI strength, but not generally effective for simultaneously increasing hot-wet compression strength (e.g., hot-wet OHC) properties and, more typically, result in a tradeoff relationship with one another.

Conventional methods utilized to increase the hot-wet compression strength properties of a polymer composite have usually involved increasing the resin matrix crosslink density to increase the elastic modulus of the resin or by reducing the water absorption characteristics of the matrix by proper formulation of the resin's specific chemistry. Efforts associated with increasing the matrix crosslink density to increase hot-wet compression strength typically result in a composite having reduced CAI properties.

Accordingly, it would be highly desirable to provide a polymer composite material having an interlayer structure which significantly enhances the toughness of the interlayer material, and thereby increase its CAI strength, without the negative feature of degrading the hot-wet compression strength of the interlayer.

In the interest of toughening the composite matrix interlayer sufficiently to improve its CAI strength, it will be appreciated that shape memory alloys (SMAs) are known to have unique, "super elastic" properties. One common, commercially available SMA is Nitinol®), a titanium-nickel alloy. This particular alloy, as well as other SMA materials, are able to undergo an atomic phase change from a higher modulus, austenitic phase when at a zero stress state, to a "softer," lower modulus, martensitic phase upon the application of a load or stress. Once the load or stress is eliminated, the alloy is able to revert to its original, stress-free, higher modulus austenitic state. In the process of absorbing the energy from the induced stress, the metal temporarily deforms similar to an elastomer. This stress-induced phase change for Nitinol® alloy is reversible and repeatable without permanent deformation of the metal up to approximately 8–10% strain levels. Nitinol® alloy is further able to absorb (i.e., store) five times the energy of steel and roughly three times the energy of titanium. A comparison of the Nitinol® (NITI) alloy's superior ability to absorb energy relative to other materials is shown below:

| Material | Maximum Springback Strain* | Stored Energy |
| --- | --- | --- |
| Steel | 0.8% | 8 Joules/cc |
| Titanium | 1.7% | 14 Joules/cc |
| Nitinol ® | 10.0% | 42 Joules/cc |

*maximum reversible springback without permanent deformation of strain-offset.

In view of the foregoing, it would be highly desirable to provide a polymer composite structure having a matrix interlayer which provides the superelastic properties of a SMA, but which does not significantly add to the weight of the overall structure, and also which does not negatively affect the hot-wet compression strength of the matrix interlayer.

SUMMARY OF THE INVENTION

The present invention is directed to a polymer composite structure having an interlayer which is reinforced with shape memory alloy (SMA) particles. The use of SMA particles in the interlayer significantly enhances the damage resistance and damage tolerance (e.g. compression-after-impact (CAI) strength) of the interlayer without negatively affecting its hot-wet compression strength.

In one preferred form the polymer composite structure comprises titanium-nickel alloy particles, and more preferably particles formed from Nitinol® alloy. The titanium-nickel alloy particles have superelastic, reversible strain properties similar to elastomeric or polymeric thermoplastic particles more traditionally utilized in the interlayer of a polymer composite structure, but do not negatively affect the hot-wet compression strength of the interlayer. The result is a polymer composite material having an interlayer which is able to even more effectively absorb impact stresses, thereby toughening the composite material without negatively affecting its hot-wet compression strength.

In one preferred embodiment the Nitinol® alloy particles are dispersed generally uniformly throughout a resin matrix interlayer of the polymer composite structure. In one preferred form the Nitinol® alloy particles comprise particles having a cross-sectional diameter no greater than about 50 microns and as small as nanometers in cross sectional diameter. The particles may be formed in cylindrical, oval, or spherical shapes, or virtually any other shape.

In one preferred embodiment all of the distinct resin interlayers include SMA particles in an austenitic phase. In an alternative preferred embodiment a plurality of distinct matrix interlayers are provided in a polymer composite structure. At least one of the interlayers includes SMA particles provided in an austenitic phase and at least one interlayer includes SMA particles provided in a martensitic phase at the same temperature, depending on the intrinsic transformation temperature of the SMA particles.

In still another alternative preferred form, an advanced hybrid fiber-metal laminate composite structure is provided wherein one or more interlayers having SMA particles are provided for bonding one or more metal layers and fiber layers to form a unitary composite structure.

In still another alternative preferred form, the distinct resin-particle interlayers include SMA particles in low concentration relative to a "resin-rich" interlayer matrix. In an alternative preferred form, the distinct resin-particle interlayers include SMA particles in high concentration as a SMA "particle-rich" interlayer, relative to the resin interlayer matrix, approaching the morphology of a continuous metal interlayer similar to fiber-metal laminates. It will be understood that a range of SMA particle concentrations within the resin matrix interlayer from low to high, proportional to the volume of the resin matrix, is possible depending on the desired properties of the resultant composite laminate.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
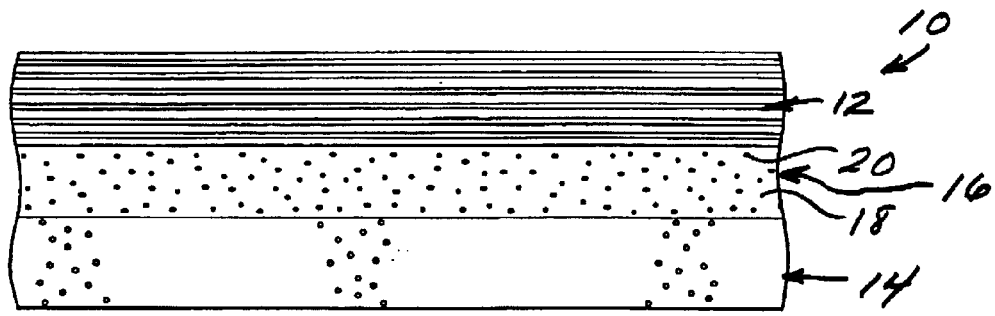
FIG. 1 is a cross-sectional side view of a portion of a polymer composite structure in accordance with a preferred embodiment of the present invention.

Referring to FIG. 1, there is shown a polymer composite structure 10 in accordance with a preferred embodiment of the present invention. The composite structure 10 includes a first fiber layer (i.e., ply) 12, a second fiber layer (ply) 14 and a resin matrix interlayer or compound 16 for bonding the layers 12 and 14 together to form a single, unitary composite structure or material. Each of layers 12 and 14 are typically comprised of a plurality of fiber elements or filaments. Layer 12 is shown with 0° fibers and layer 14 is shown with 90° fibers (i.e., fibers orientated at 90° from those of layer 12). It will be appreciated, however, that the particular arrangement of the fibers of each layer 12 and 14 could be varied to suit the needs of a particular application, and that the arrangement of the fibers of layers 12 and 14 at a 90° angle relative to one another is only for exemplary purposes.

The resin matrix layer 16 is comprised of a resin material 18 within which is dispersed a plurality of shape memory alloy (SMA) particles 20. The resin material 18 may comprise various thermosetting or thermoplastic polymer matrices or any other suitable resin for forming a polymer composite structure. The SMA particles 20 are preferably dispersed generally uniformly through the resin matrix interlayer 16 and may range from very low to very high in particle concentration relative to the resin matrix interlayer. The SMA particles 20 may comprise any one of a plurality of materials generally recognized to fall within the class of "shape memory alloys," but in one preferred form the particles 20 comprise nickel-titanium alloy particles known under the trade name "Nitinol®." The SMA particles 20 have reversible-superelastic strain properties without permanent deformation in the austenitic state which effectively serve to toughen the interlayer 16 and significantly improve damage resistance and damage tolerance (e.g. compression-after-impact (CAI) strength) of the interlayer 16 without adversely effecting the hot-wet compression strength of the interlayer. This is important because increasing the CAI strength of the interlayer serves to toughen the interlayer against microcracking and delamination but without the negative impact of lowering the hot-wet compression strength of the overall polymer composite structure 10. This is due in part to the fact that the use of the SMA particles 20 eliminates the need to use elastomeric particles such as rubber or thermoplastic particles such as nylon, which are more typically used to strengthen the composite laminate interlayer, but which are known to absorb water in the resin 18, and therefore result in a reduction in the hot-wet compression strength of the interlayer 16. SMA particles, and particularly Nitinol® alloy, do not absorb water, and therefore do not negatively impact the hot-wet compression strength of the interlayer 16.

It will also be appreciated that the use of SMA metal particles as a resin additive provides the added benefit of serving to disperse the energy of an electric charge, such as from a lightening strike, more evenly throughout the composite structure 10. This is particularly important in aerospace applications where the composite structure 10 is to be used to form a portion of an aircraft that could experience a lightening strike during operation. The SMA particles 20 effectively serve to spread out or dissipate the electric charge over a greater area of the composite structure 10, thereby reducing the chance of damage to a localized portion of the structure.

Still another significant advantage of the SMA particles 20 is that they do not tangibly increase the overall weight of the composite structure 10 due to the resultant gains in overall strength of the composite under hot/wet conditions which typically limit the performance envelope for polymer composite structures. Again, this is particularly important in aerospace applications where lightweight, yet structurally strong components are highly important. Moreover, the use of SMA particles 20 in the matrix interlayer does not require significant modification to existing composite part fabrication processes where composite structures are formed using prepreg materials and are easily incorporated into advanced composite part fabrication processes not involving preimpregnated material forms (e.g. resin transfer molding (RTM), vacuum assisted resin transfer molded (VARTM), resin infusion, etc).

Figure 2:
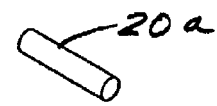
FIG. 2 is a perspective view of one cylindrical (i.e., "filament" shaped) SMA particle used in the resin matrix interlayer of the composite structure shown in FIG. 1.
Figure 3:
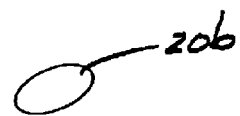
FIG. 3 is a perspective view of an oval shaped SMA particle which may be used in the resin matrix interlayer of the structure shown in FIG. 1.
Figure 4:
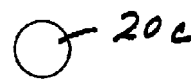
FIG. 4 is a plan view of a spherical SMA particle which may be used in the resin matrix interlayer of the structure of FIG. 1.

Referring to FIGS. 2–4, various representative forms of the SMA particles 20 are illustrated. FIG. 2 illustrates a cylindrically shaped SMA particle 20a, FIG. 3 illustrates an oval shaped particle 20b, and FIG. 4 illustrates a spherically shaped SMA particle 20c. It will be appreciated that other variations of these shapes could just as easily be used, and mixtures of differently shaped SMA particles 20 could also be employed. The cross-sectional diameter of the SMA particles 20 may vary considerably, but in one preferred form is in the range of between about 50 microns ($50 \times 10^{-6}$ meter) and 0.005 microns ($5 \times 10^{-9}$ meter).

The use of Nitinol® alloy as the SMA material provides significant resistance to impact damage of the composite structure 10. This is because Nitinol® alloy is capable of absorbing a significant degree of impact and deformation due to its high elongation properties. Nitinol® alloy provides reversible, strain properties of up to 8–10% strain without permanent deformation (or strain offset) when in its austenitic phase. This provides significant load-velocity impact resistance. Nitinol® alloy also provides a non-reversible strain property enabling up to 20–25% elongation-to-failure for high velocity impact resistance. Nitinol® alloy also has significant vibration dampening properties while in the martensitic state that help to improve the fatigue life of the composite structure 10, which is an especially desirable characteristic for aircraft and spacecraft structures.

Figure 5:
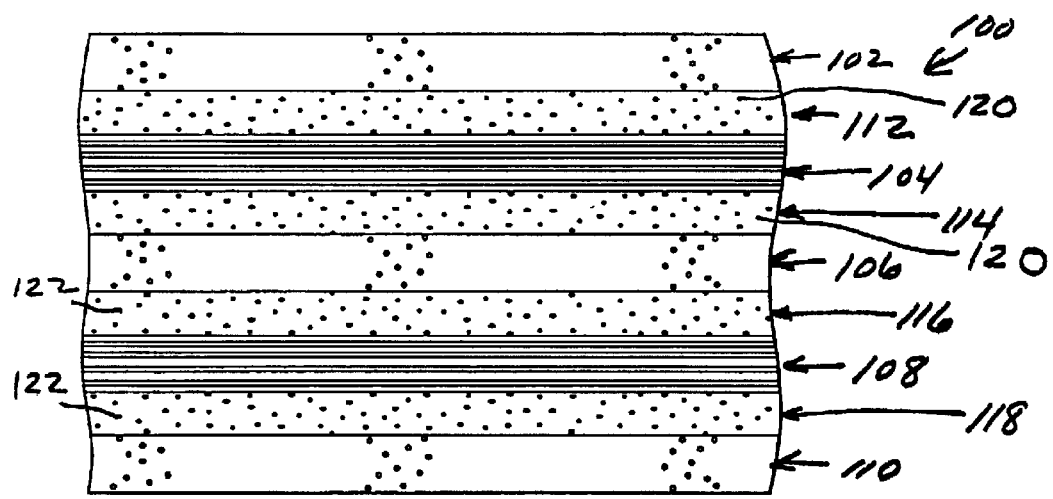
FIG. 5 is a side cross-sectional view of an alternative preferred form of the polymer composite structure of the present invention illustrating the use of distinct interlayers having austenitic and martensitic phase SMA particles.

Referring now to FIG. 5, there is shown a polymer composite structure 100 which incorporates fiber layers or plies 102, 104, 106, 108 and 110, with fiber layer 102 representing an outmost layer and layer 110 representing an innermost layer. These layers 102–110 are separated by resin matrix interlayers 112, 114, 116 and 118. While fiber layers 102, 104, 106, 108 and 110 are shown as having fibers arranged at 90° angles relative to each layer, it will be appreciated that various other arrangements could be employed. In this embodiment, resin matrix interlayers 112 and 114 are comprised of SMA particles 120, such as Nitinol® alloy particles, in the austenitic phase. However, resin matrix interlayers 116 and 118 are comprised of SMA particles 122 in the martensitic phase. Nitinol® alloy in the austenitic phase has superelastic properties (i.e., reversible, strain properties) and is able to withstand impacts without permanent deformation (e.g., up to 10% strain levels). The Nitinol® alloy is also able to absorb significant vibrations and shock and therefore prevents permanent deformation of the layers 112 and 114. Nitinol® alloy in the martensitic phase, however, has extremely high specific dampening capacity (SDC) and is able to dampen impact energies (i.e., shock) to protect against delamination of the independent plies of the composite structure 100. Effectively, the Nitinol® alloy in the martensitic phase acts as a vibration/shock energy absorber (i.e., sink) to help significantly dissipate impact energies experienced by the composite structure 100. Depending on the composite structure's application, the transformation temperature of the Nitinol® particles utilized can be selected so that the SMA is in the desired atomic state (austenitic or martensitic) to yield the desired properties and performance of the material.

Figure 6:
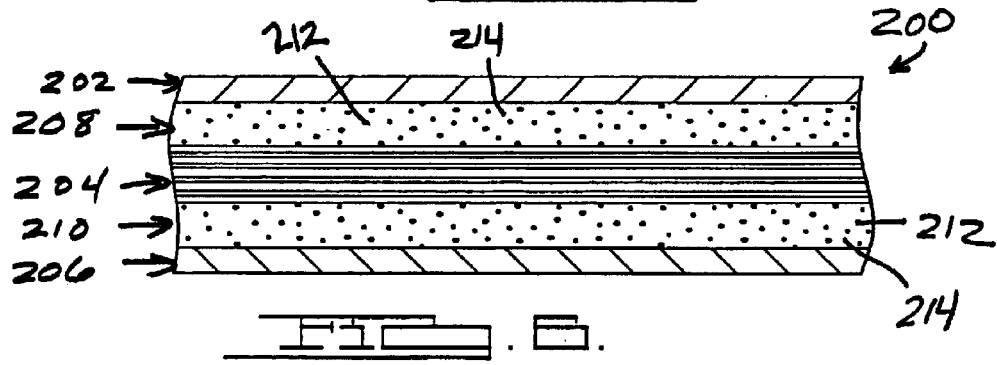
FIG. 6 is a side cross-sectional view of an advanced, hybrid, fiber-metal laminate composite structure in accordance with an alternative preferred embodiment of the present invention.

Referring now to FIG. 6, a composite structure 200 in accordance with yet another alternative preferred embodiment of the present invention is shown. The composite structure 200 forms an advanced, hybrid fiber-metal laminate composite structure. The structure 200 includes a metal ply 202, a fiber ply 204 and another metal ply 206. The fiber ply 204 is sandwiched between the metal plies 202 via a pair of resin matrix interlayers 208 and 210. Each of resin matrix interlayers 208 and 210 includes a plurality of SMA particles 212 formed within a suitable resin 214. Again, the SMA particles may comprise Nitinol® alloy particles in either the austenitic or martensitic states depending on the application's intended use.

In each of the above-described embodiments, it will be appreciated that the amount of SMA particles by volume in a given resin matrix interlayer can vary significantly to suit the needs of a specific application. Typically, however, the resin matrix interlayer will comprise about 3%–30% SMA particles by volume, but these particles may be utilized in significantly higher concentrations as a discontinuous, particle-rich layer approaching the morphology similar to a discrete, continuous metal ply as in fiber-metal laminates. Alternatively, a lesser concentration of the SMA particles 20 could just as readily be used to suit a specific application. While Nitinol® alloy is a particularly desirable SMA, it will be appreciated that other SMAs such as Ni—Ti—Cu, Cu—Al—Ni—Mn and a recently developed nickel-free, pseudoelastic beta titanium alloy may also be used with the present invention.

The use of Nitinol® alloy as the SMA material also provides a number of additional advantages. Nitinol® alloy has excellent corrosion resistance and high wear (i.e., erosion) resistance, relative to steel. The wear resistance of Nitinol® alloy is on the order of 10 times greater than that of steel. When Nitinol® is added to a thermosetting polymer composite, it can improve the $G_{1c}/G_{11c}$ properties (i.e., mechanical properties reflecting fracture resistance) of the composite. The Nitinol® alloy, as mentioned in the foregoing, also provides significantly improved electrical conductivity for the composite structure to thus improve its durability relative to repeated lightening strikes. The overall durability of the outer surface of the composite is also improved (i.e., regarding wear and erosion resistance).

Still further advantages of the use of Nitinol® alloy for the SMA particles is that the use of Nitinol® alloy has little impact on current manufacturing processes. More specifically, Nitinol® alloy does not require significant modification to ATLM (Automated Tape Laying Machining), hot-drape forming, advanced fiber placement (AFP), and hand lay-up operations. The use of Nitinol® alloy is also readily applicable to Resin Transfer Molding (RTM), Vacuum Assisted Resin Transfer Molding (VARTM) and Seamann Composite's Resin Injection Molding Process (SCRIMP), where the Nitinol® alloy particles are added to the surface of the preform's fibers or partitioned between layers of the preform's plies prior to resin impregnation processes. Still another unique benefit to the use of a SMA particle-toughened composite structure would be its ability to be utilized in a form equivalent to prepreg materials currently used (i.e., unidirectional tape and fabric prepregs) without impacting current machine processes. The SMA particle-toughened composite could possibly also act as a "drop-in" replacement for current materials used in such processes as Automated Tape Laying Machining (ATLM), advanced fiber placement (AFP), hot-drape forming and conventional hand layup. As will be appreciated, the use of SMA particles within the interlayers of a composite structure has significant specific advantages to aircraft structures. The vibration dampening characteristics of the Nitinol® alloy particles will significantly enhance the fatigue-life of aircraft structures. In space applications, where typically stiff composite structures are subjected to extreme acoustic and structural vibrations during launch, the Nitinol® alloy particles will provide added protection against delamination and fracturing of the interlayers.

It will also be appreciated that the use of Nitinol® alloy particles provides significant, additional manufacturing advantages. Presently, it is not practical (or possible) to use elongated Nitinol® alloy fibers (i.e., "wires"), or any SMA wire, for the fabrication of actual contoured composite parts to toughen such parts. By the very nature of the SMA wire, the wire will not conform and stay conformed to the shape of a non-planar (i.e., contoured) part mold during part fabrication due to its superelastic properties. This is because the SMA wire straightens immediately after being bent, once pressure is removed.

Secondly, there is currently no known commercial source of superelastic Nitinol® alloy wire supplied in a tape form, similar to unidirectional carbon fiber tape prepreg. This is likely due to the difficulty of providing such a product since the material would unspool like a loose spring due to the SMA properties of the wires. Moreover, the SMA filaments would not likely stay evenly collimated in such a material form. It will be appreciated that carbon fiber prepreg is manufactured with carbon filaments that are highly collimated unidirectionally in a tape form and held to tight dimensional tolerances in thickness across the width and length of the material. Prior to cure, carbon fibers impregnated with resin are limp and drapable allowing the tape to conform to part molds. These characteristics are virtually impossible to obtain with SMA wire due to its stiffness and spring-like characteristics.

The utilization of SMA particles as a resin matrix additive provides the benefit of toughening the composite laminate, as well as provides additional performance benefits to the structure as previously cited. Most significantly, the SMA as a particle additive enables the practical use of shape memory alloys in composite materials and further enables the composite material to serve as a "drop-in" material, as mentioned herein, for current and advanced production processes in the manufacture of composite parts of various design complexity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A composite structure, comprising:
   a first layer of material;
   a second layer of material;
   a resin layer disposed between said first and second layers of material for bonding said layers together to form a unitary structure;
   a plurality of shape memory alloy (SMA) particles dispersed throughout at least a portion of said resin layer for toughening said unitary structure; and
   wherein said SMA particles are provided in an austenitic state.

2. The composite structure of claim 1, wherein said SMA particles comprise Nitinol® alloy particles.

3. The composite structure of claim 1, wherein said SMA particles comprise cylindrical shaped SMA particles.

4. The composite structure of claim 1, wherein said SMA particles comprise oval shaped SMA particles.

5. The composite structure of claim 1, wherein said SMA particles comprise generally spherical shaped SMA particles.

6. The composite structure of claim 1, wherein said SMA particles comprise a cross-sectional diameter no greater than approximately 50 microns.

7. A composite structure, comprising:
   a first fibrous layer;
   a second fibrous layer;
   a resin matrix compound disposed between said first and second layers of material for bonding said layers together to form a unitary structure; and
   a plurality of metal particles dispersed throughout at least a portion of said resin matrix layer, said particles comprising a reversible, super elastic strain property for toughening said unitary structure without negatively affecting a hot-wet compression strength of said resin matrix compound; and
   wherein said metal particles are provided in an austenitic phase.

8. The composite structure of claim 7, wherein said metal particles comprise Nitinol® alloy particles.

9. The composite structure of claim 8, wherein said metal particles comprise one of:
   oval shaped particles;
   spherical shaped particles; and
   cylindrical shaped particles.

10. The composite structure of claim 9, wherein said metal particles comprise a cross sectional diameter no greater than approximately 50 microns.

* * * * *